US009015587B2

(12) United States Patent
Jin et al.

(10) Patent No.: US 9,015,587 B2
(45) Date of Patent: Apr. 21, 2015

(54) HOME NETWORK DEVICE AND METHOD OF RECEIVING AND TRANSMITTING SOUND INFORMATION USING THE SAME

(75) Inventors: Ho Jin, Suwon-si (KR); Jung-yon Cho, Suwon-si (KR); Il-joo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 11/514,110

(22) Filed: Sep. 1, 2006

(65) Prior Publication Data

US 2007/0074247 A1    Mar. 29, 2007

Related U.S. Application Data

(60) Provisional application No. 60/719,968, filed on Sep. 26, 2005.

(30) Foreign Application Priority Data

Apr. 18, 2006  (KR) .......................... 10-2006-0035101

(51) Int. Cl.
*G06F 3/16*  (2006.01)
*G06F 15/16*  (2006.01)
*H04M 3/493*  (2006.01)
(Continued)

(52) U.S. Cl.
CPC .............. *H04N 5/04* (2013.01); *H04L 12/2803* (2013.01); *H04N 5/4401* (2013.01); *H04N 5/60* (2013.01); *H04N 7/106* (2013.01); *H04N 21/43615* (2013.01); *H04N 21/4852* (2013.01); *H04N 21/8106* (2013.01); *H04N 21/8193* (2013.01); *H04N 21/8352* (2013.01)

(58) Field of Classification Search
CPC ............ H04L 12/2803; H04L 12/2807; H04L 12/2809; H04N 21/43615; G06F 3/0484; G06F 3/165; G06F 17/3074
USPC ................ 700/11, 17, 19; 709/204, 203, 218; 340/825; 725/37; 715/716
See application file for complete search history.

(56) References Cited

U.S. PATENT DOCUMENTS 6,097,441 A * 8/2000 Allport .......................... 348/552
6,344,861 B1   2/2002 Naughton et al.
(Continued)

FOREIGN PATENT DOCUMENTS

EP       1316896 A1    6/2003
JP       11-249709 A   9/1999
(Continued)

OTHER PUBLICATIONS

Jeong-Seok Oh, Derwent-ACC-2004-763060, pp. 1, Abstract.*
(Continued)

*Primary Examiner* — Ece Hur
(74) *Attorney, Agent, or Firm* — Sughrue Mion, PLLC (57) ABSTRACT

A home network device and a method of receiving and transmitting sound information using the same are provided. The home network device includes a reception unit, a display unit and a sound playing unit. The reception unit receives a user interface, which is used to control a control target device, and sound information, which is synchronized with the user interface, from the control target device connected through a home network. The display unit displays the received user interface. The sound playing unit plays the received sound information when the user interface is displayed.

15 Claims, 10 Drawing Sheets

(51) Int. Cl.
*H04W 4/00* (2009.01)
*G05B 11/01* (2006.01)
*H04N 5/04* (2006.01)
*H04N 5/44* (2011.01)
*H04N 5/60* (2006.01)
*H04N 7/10* (2006.01)
*H04N 21/436* (2011.01)
*H04N 21/485* (2011.01)
*H04N 21/81* (2011.01)
*H04N 21/8352* (2011.01)
*H04L 12/28* (2006.01)

(56) References Cited

U.S. PATENT DOCUMENTS

| | | | |
|---|---|---|---|
| 6,346,951 B1 | 2/2002 | Mastronardi | |
| 6,374,079 B1* | 4/2002 | Hsu | 455/11.1 |
| 6,434,447 B1* | 8/2002 | Shteyn | 700/245 |
| 6,523,696 B1* | 2/2003 | Saito et al. | 709/223 |
| 6,614,347 B2* | 9/2003 | Tanguay | 340/508 |
| 6,636,938 B1 | 10/2003 | Kim | 711/105 |
| 6,637,030 B1* | 10/2003 | Klein | 725/78 |
| 6,825,762 B2* | 11/2004 | Giacopelli et al. | 340/531 |
| 6,931,236 B2* | 8/2005 | Kaplan | 455/67.11 |
| 6,963,784 B1* | 11/2005 | Gibbs | 700/94 |
| 7,081,813 B2* | 7/2006 | Winick et al. | 340/521 |
| 7,136,709 B2* | 11/2006 | Arling et al. | 700/65 |
| 7,139,617 B1* | 11/2006 | Morgan et al. | 700/17 |
| 7,254,403 B2* | 8/2007 | La et al. | 455/456.1 |
| 7,257,661 B2* | 8/2007 | O'Donnell | 710/305 |
| 7,337,217 B2* | 2/2008 | Wang | 709/217 |
| 7,349,967 B2* | 3/2008 | Wang | 709/227 |
| 7,379,664 B2* | 5/2008 | Marcus | 396/56 |
| 7,403,838 B2* | 7/2008 | Deen et al. | 700/276 |
| 7,486,271 B2* | 2/2009 | Hershkovitz et al. | 345/156 |
| 8,063,749 B2* | 11/2011 | Rye et al. | 340/12.5 |
| 8,140,955 B2* | 3/2012 | Kim | 715/203 |
| 8,289,813 B2* | 10/2012 | Bull et al. | 368/73 |
| 8,437,225 B2* | 5/2013 | Bull et al. | 368/10 |
| 2002/0101344 A1* | 8/2002 | Tanguay | 340/508 |
| 2003/0000233 A1* | 1/2003 | Mazereeuw | 62/126 |
| 2003/0001883 A1* | 1/2003 | Wang | 345/736 |
| 2003/0009537 A1* | 1/2003 | Wang | 709/219 |
| 2003/0018975 A1* | 1/2003 | Stone | 725/105 |
| 2003/0061427 A1* | 3/2003 | O'Donnell | 710/300 |
| 2003/0075746 A1* | 4/2003 | Maeda et al. | 257/288 |
| 2003/0122676 A1* | 7/2003 | Cuijpers et al. | 340/573.1 |
| 2004/0054747 A1* | 3/2004 | Breh et al. | 709/208 |
| 2004/0060072 A1* | 3/2004 | Klein | 725/127 |
| 2005/0096753 A1* | 5/2005 | Arling et al. | 700/11 |
| 2005/0128068 A1* | 6/2005 | Winick et al. | 340/517 |
| 2006/0169529 A1* | 8/2006 | Tamakoshi | 181/131 |
| 2006/0177118 A1* | 8/2006 | Ibikunle et al. | 382/137 |
| 2006/0214808 A1* | 9/2006 | Fusco | 340/585 |
| 2006/0256935 A1* | 11/2006 | Tofts et al. | 379/88.2 |
| 2006/0287821 A1* | 12/2006 | Lin | 701/213 |
| 2007/0074247 A1* | 3/2007 | Jin et al. | 725/37 |
| 2007/0091805 A1* | 4/2007 | Ramprashad et al. | 370/230.1 |
| 2007/0093200 A1* | 4/2007 | Dobosz | 455/3.02 |
| 2007/0130289 A1* | 6/2007 | Defazio et al. | 709/218 |
| 2007/0174471 A1* | 7/2007 | Van Rossum | 709/229 |
| 2007/0279247 A1* | 12/2007 | Rye et al. | 340/825.72 |
| 2008/0211698 A1* | 9/2008 | Zach | 341/23 |
| 2008/0313530 A1* | 12/2008 | Song et al. | 715/234 |
| 2010/0027770 A1* | 2/2010 | Park et al. | 379/106.01 |
| 2010/0262865 A1* | 10/2010 | Kim et al. | 714/37 |
| 2011/0018729 A1* | 1/2011 | Kim et al. | 340/679 |
| 2011/0022358 A1* | 1/2011 | Han et al. | 702/183 |
| 2011/0032072 A1* | 2/2011 | Han et al. | 340/5.1 |

FOREIGN PATENT DOCUMENTS

| | | | | |
|---|---|---|---|---|
| JP | 2001-356851 A | | 12/2001 | |
| JP | 2004-304767 A | | 10/2004 | |
| JP | 2006203306 A | * | 8/2006 | |
| KR | 1998-037155 A | | 8/1998 | |
| KR | 2001-0002201 A | | 1/2001 | |
| KR | 10-2001-0039846 A | | 5/2001 | |
| KR | 2003-0030331 A | | 4/2003 | |
| KR | 2004058655 | * | 5/2004 | H04B 7/26 |
| KR | 10-2005-0008155 A | | 1/2005 | |
| KR | 10-2005-0066454 A | | 6/2005 | |
| KR | 10-2006-0004095 A | | 1/2006 | |
| WO | 00/26794 A1 | | 5/2000 | |
| WO | WO 2008013379 A2 | * | 1/2008 | H04L 12/28 |

OTHER PUBLICATIONS

Delgado et al., Remote-Controlled Home Automation Systems with Different Network Technologies. 2004.*

* cited by examiner

HOME NETWORK DEVICE AND METHOD OF RECEIVING AND TRANSMITTING SOUND INFORMATION USING THE SAME

CROSS-REFERENCE TO RELATED APPLICATIONS

This application claims priority from Korean Patent Application No. 10-2006-0035101 filed on Apr. 18, 2006 in the Korean Intellectual Property Office, and U.S. Provisional Patent Application No. 60/719,968 filed on Sep. 26, 2005 in the United States Patent and Trademark Office, the disclosures of which are incorporated herein by reference in their entirety.

BACKGROUND OF THE INVENTION

1. Field of the Invention

Methods and apparatuses consistent with the present invention relate to receiving and transmitting sound information using a home network device and, more particularly, to a home network device that can control a control target device through a user interface and sound information transmitted from the control target device connected to a home network, and a method of receiving and transmitting sound information using the home network device.

2. Description of the Related Art

A home network system refers to a technology in which home appliances are connected to a network, so that communication between humans, between devices, and between a human and a device can be performed.

Home appliances can be conveniently controlled through such communication without limitation with respect to space or the devices, and many various forms of service can be received, therefore enhancing the quality of life.

The home network system may include a control device, such as a digital television (TV) or a personal digital assistant (PDA), with which a user controls the devices of a home network through a user interface, and control target devices, such as a set-top box and a digital versatile disk (DVD), which are controlled by the control device.

In this case, the control device provides a user interface for a specific control target device, and the user controls the specific control target device through the user interface. Meanwhile, the control device may be provided with user interfaces for controlling all of the control target devices connected through the home network, but does not have a user interface for a control target device that is newly added to the home network, so that inconvenience occurs in that an additional user interface for the newly added control target device must be provided to the user through a separate download.

Recently, for the case in which the control device is not provided with a user interface for a specific control target device, the control device provides a user interface, which is transmitted from the corresponding control target device, to the user. Accordingly, even in the state in which the control device is not provided with a user interface for a corresponding control target device, the user can control the corresponding control target device.

As described above, the technology in which the control device provides the user interface, which is transmitted from the corresponding control target device, to a user has been standardized in Intel's eXtended Remote Technology (XRT) and Samsung's eXpandable Home Theater (XHT).

Figure 1:
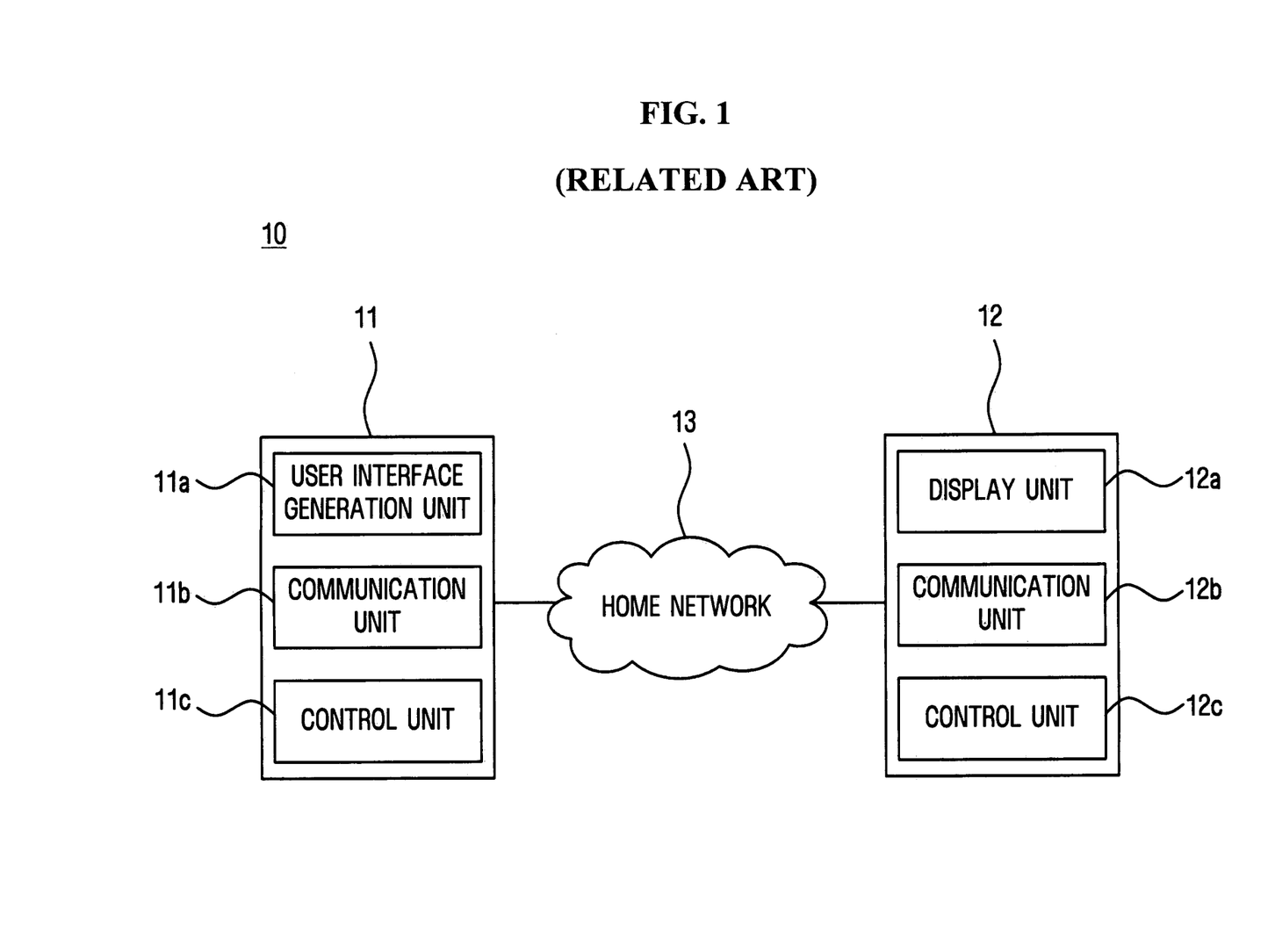
FIG. 1 is a diagram showing the construction of a related art home network system.

FIG. 1 is a diagram showing the construction of a related art home network system.

As shown in FIG. 1, the related art home network system 10 includes a control target device 11 and a control device 12.

The control target device 11 includes a user interface generation unit 11a for generating a user interface to be transmitted to the control device 12 connected through a home network 13, a communication unit 11b for transmitting the generated user interface to the control device 12 and receiving a request for the user interface from the control device 12, and a control unit 11c for controlling the generation and transmission of the user interface in response to the request from the control device 12.

The control device 12 includes a display unit 12a for displaying the user interface transmitted from the control target device 11 connected through the home network 13, a communication unit 12b for requesting the user interface from the control target device 11 and receiving the user interface corresponding to a request result, and a control unit 12c for controlling the request of the user interface and the display of the received user interface according to the user's control.

The home network system of FIG. 1 provides a user interface, which is transmitted from a control target device that a user desires to control, to the user, so that the user can control the control target device even though the user does not know the details about the control target device.

However, in the case where an event attributable to a different control device occurs in the control target device or an event attributable to a variation in the status of the control target device occurs, a problem occurs in that the occurrence of the event cannot be made known to the user.

In other words, the variation in status attributable to the occurrence of the event in the control target device is not taken into account by the user interface that is already being displayed through the control device, so that normal operation may not be performed.

For example, in the case where the control target device has been in play status while the user interface, transmitted from the control target device, is displayed on the control device and then playing is stopped due to device trouble in the control target device, there is no method of announcing the fact that device trouble has occurred in the control target device through the user interface already displayed on the control device.

To solve such a problem, Korean Unexamined Pat. No. 2005-0018317 discloses a method that can easily control a control target device using a convenient method even though the details about the control target device are not known, and allows a control device to easily detect the occurrence of an event in the case where an event occurs in the control target device.

In the disclosed method, the control device can detect the occurrence of an event corresponding to variation in status in the control target device. However, the disclosed method does not address the case where it is necessary to transmit sound information corresponding to variation in the status of the control target device, for example, an alarm sound or an effect sound.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a home network device that allows a control device to control a control target device using a user interface and sound information to be transmitted from the control target device, and a method of receiving and transmitting sound information using the home network device.

According to an aspect of the present invention, there is provided a home network device including a reception unit receiving a user interface, which is used to control a control target device, and sound information, which is synchronized with the user interface, from the control target device connected through a home network; a display unit displaying the received user interface; and a sound playing unit playing the received sound information when the user interface is displayed.

According to another aspect of the present invention there is provided a home network device including a user interface generation unit generating a user interface in response to a request from a control device connected through a home network; a sound information generation unit generating sound information which is to be synchronized with the generated user interface; and a transmission unit transmitting the user interface and the sound information to the control device.

According to another aspect of the present invention, there is provided a method of receiving sound information using a home network device, the method including receiving a user interface, which is used to control a control target device, and sound information, which is synchronized with the user interface, from the control target device connected through a home network; displaying the received user interface; and playing the received sound information when the user interface is displayed.

According to another aspect of the present invention, there is provided a method of transmitting sound information using a home network device, the method including generating a user interface in response to a request from a control device connected through a home network; generating sound information which is to be synchronized with the generated user interface; and transmitting the user interface and the sound information to the control device.

BRIEF DESCRIPTION OF THE DRAWINGS

The above and other aspects of the present invention will be more clearly understood from the following detailed description of exemplary embodiments taken in conjunction with the accompanying drawings, in which.

DETAILED DESCRIPTION OF EXEMPLARY EMBODIMENTS OF THE INVENTION

The advantages and characteristics of the present invention, and the method of achieving them, will be apparent with reference to exemplary embodiments described in detail later in conjunction with accompanying drawings. However, the present invention is not limited to the exemplary embodiments disclosed below, but may be implemented in various ways. Furthermore, the embodiments are provided to complete the disclosure of the present invention, and to fully notify those skilled in the art of the scope of the present invention. The present invention is defined only by the appended claims. The same reference numerals are used throughout the different drawings to designate the same or similar components.

Descriptions of the exemplary embodiments of the present invention are made below with reference to drawings in conjunction with block diagrams or flowcharts illustrating a home network device and a method of receiving and transmitting sound information. In this case, it will be understood that each block of the flowchart illustrations, and combinations of blocks in the flowchart illustrations, can be implemented using computer program commands.

These computer program commands can be provided to a processor of a general-purpose computer, a special purpose computer, or other programmable data processing apparatus to produce a machine, such that the commands, which are executed on the processor of the computer or other programmable data process apparatus, create means for implementing the functions specified in the flowchart block or blocks. These computer program commands may also be stored in computer-usable or computer-readable memory that can direct a computer or other programmable data processing apparatus to function in a particular manner, such that the commands, which are stored in the computer-usable or computer-readable memory, enable the production of a product that includes a command means for implementing the functions specified in the flowchart block or blocks.

The computer program commands may also be loaded onto a computer or other programmable data processing apparatus to cause a series of operational steps to be performed on the computer or other programmable apparatus to produce a computer-implemented process so that the commands that are executed on the computer or other programmable apparatus provide steps for implementing the functions specified in the flowchart block or blocks.

Furthermore, each block in the flowchart illustrations may represent a module, segment, or portion of code, which comprises one or more executable commands for implementing the specified logical function(s). It should also be noted that in some alternative implementations, the functions noted in the blocks may occur in a different order. For example, two blocks shown in succession may in fact be executed concurrently or may sometimes be executed in reverse order, depending upon the desired functionality.

Exemplary embodiments of the present invention are described in detail with reference to the accompanying drawings below.

Figure 2:
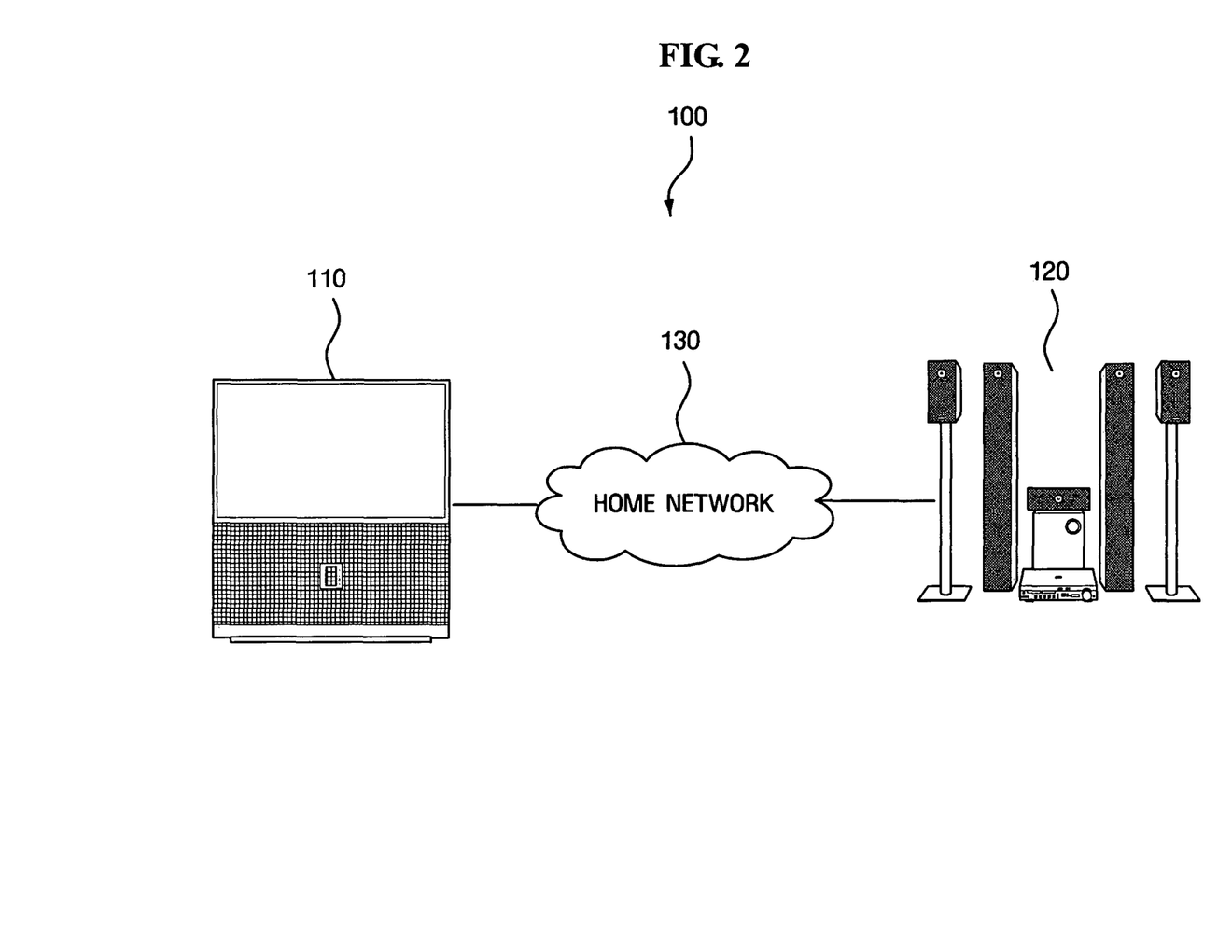
FIG. 2 is a diagram schematically showing the construction of a home network system according to an exemplary embodiment of the present embodiment.

FIG. 2 is a diagram schematically showing the construction of a home network system according to an exemplary embodiment of the present embodiment.

As shown in FIG. 2, the home network system 100 according to an exemplary embodiment of the present invention may include a control device 110 and a control target device 120 connected through a home network 130.

In the present exemplary embodiment, the description of the case where the control device 110 is a video device, such as a digital TV or PDA, that displays a predetermined user interface received from the control target device 120 and requests the user interface from the control target device 120 according to an input value input by a user, is made by way of example, and the description of the case where the control target device 120 is a set-top box or a DVD player, which transmits the user interface to the control device 110 in response to a request from the control device 110, is made by way of example.

Figure 3:
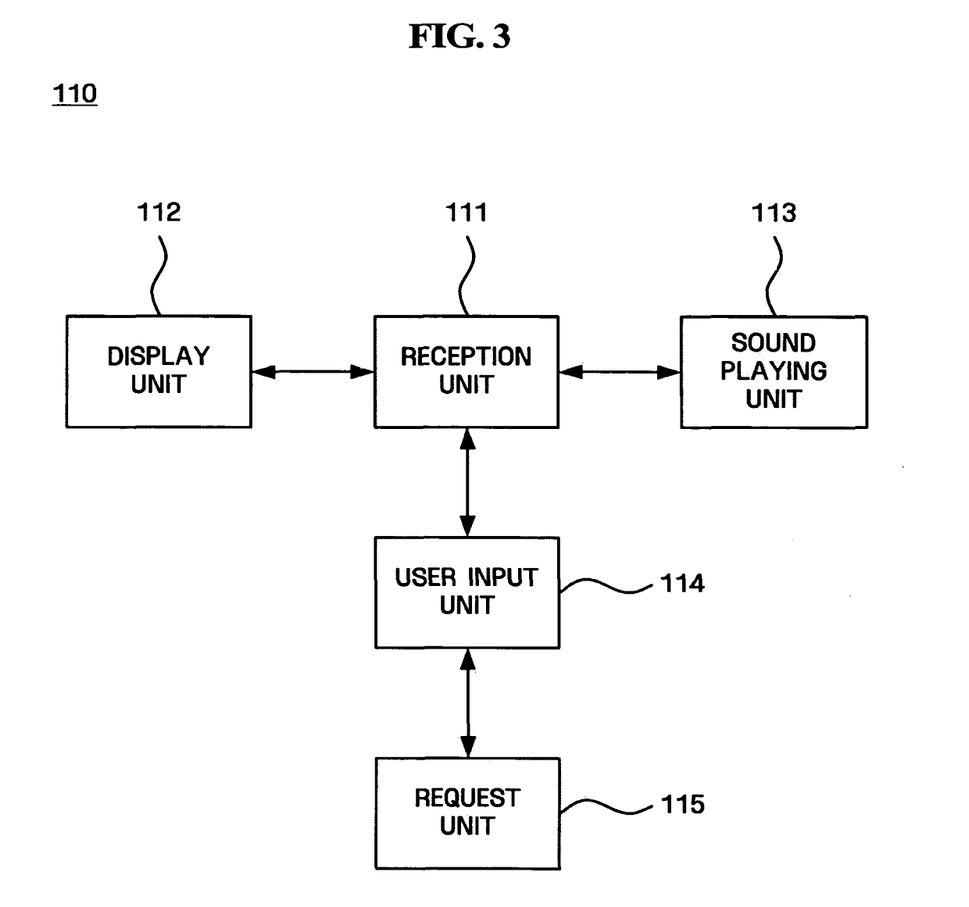
FIG. 3 is a block diagram showing the construction of a control device according to a first exemplary embodiment of the present invention.

FIG. 3 is a block diagram showing the construction of a control device according to a first exemplary embodiment of the present invention.

As shown in FIG. 3, the control device 110 according to the first exemplary embodiment of the present invention may include a reception unit 111 for receiving a user interface, which is used to control the control target device 120, and sound information, which is synchronized with the user interface, from the control target device 120 connected through the home network 130, a display unit 112 for displaying the received user interface, a sound playing unit 113 for playing the received sound information according to the displayed user interface, a user input unit 114 for receiving an input value from a user, and a request unit 115 for requesting a user interface corresponding to the input value from the control target device 120.

If a user interface, requested according to the user's control, or sound information, synchronized with the requested user interface, does not exist, the reception unit 111 can receive sound information along with the user information. In this case, the received sound information conforms to the transmission protocol of the user interface, but no limitation is made thereto.

The display unit 112 may display the user interface received through the reception unit 111. In the case where the sound information, synchronized when the received user interface is displayed, is received, the sound playing unit 113 can play the received sound information.

The user input unit 114 may allow the user to use the user interface, displayed through the display unit 112, and input an input value for controlling the control target device 120. The request unit 115 may request a user interface, which corresponds to the input value input by the user through the user input unit 114, from the control target device 120.

For example, in the case where the control target device 120 is a DVD player, a user interface for playing-related control of the DVD player is displayed through the display unit 112, the user may input an input value for the playing-related control of the DVD player through the user input unit 114 using the displayed user interface. In this case, the request unit 115 may request the user interface, which corresponds to the input value, input through the user input unit 114, from the control target device 120.

Meanwhile, although the description of the case where the control device 110 receives sound information from the control target device 120 and plays the received sound information through the sound playing unit 113 has been made by way of example, no limitation is made thereto, and the control device 110 may previously store designated sound information, receive only identification (ID) information for identifying the previously stored sound information from the control target device 120, and then play back sound information corresponding to the received ID information.

Meanwhile, the control device 110 according to the first exemplary embodiment of the present invention may be applied to the case where a user interface for controlling the control target device 120 and sound information, which is synchronized with the user interface, are received. Furthermore, in relation to a game, the control device 110 may be applied to the case where a user interface for executing the game and sound information are received together in the same manner.

Figure 4:
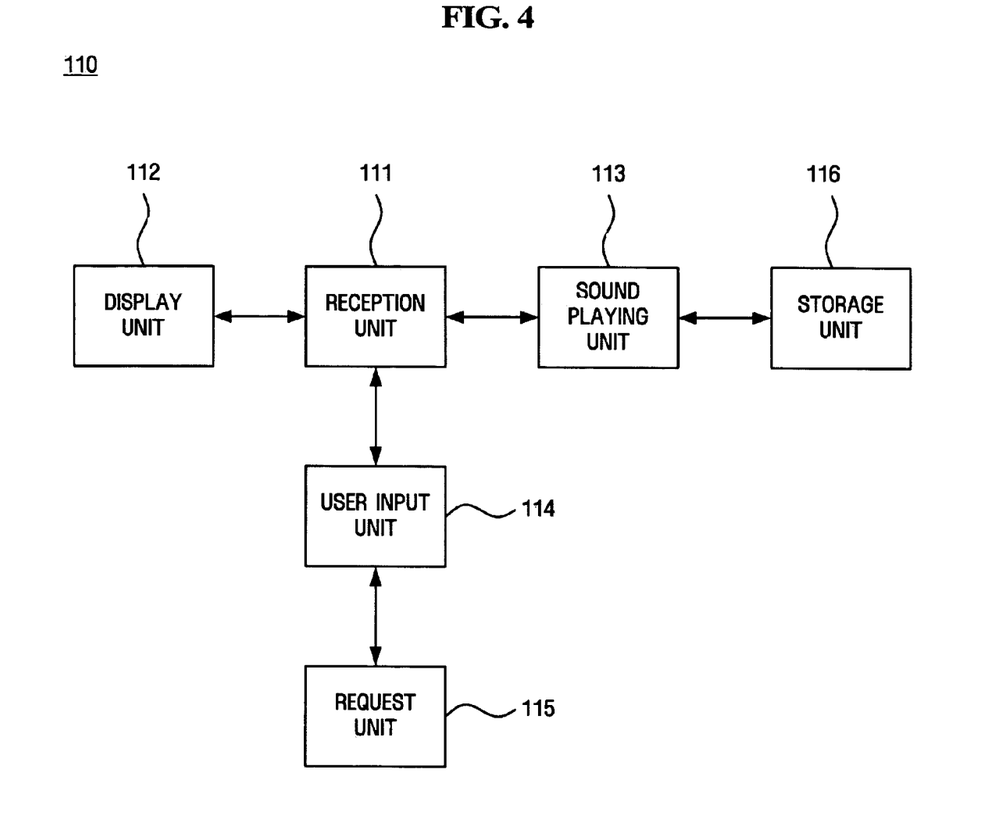
FIG. 4 is a block diagram showing the construction of a control device according to a second exemplary embodiment of the present invention.

FIG. 4 is a block diagram showing the construction of a control device according to a second exemplary embodiment of the present invention.

As shown in FIG. 4, the control device 110 according to the second exemplary embodiment of the present invention may be configured in such a manner that a storage unit 116 is additionally included in the above-described components 111, 112, 113, 114 and 115 of FIG. 3.

In this case, the storage unit 116 stores sound information corresponding to the ID information for the sound information received from the control target device 120. The sound playing unit 113 may extract corresponding sound information, conforming to the ID information received from the control target device 120, from the storage unit 116, and play back the extracted sound information.

As described above, the case where only the ID information for the sound information is received from the control target device 120 is the case where the previously designated sound information is stored in the control device 110. The operation in the case in which sound information is not previously designated is the same as that in FIG. 3, so that the playback of the sound information can be performed.

Figure 5:
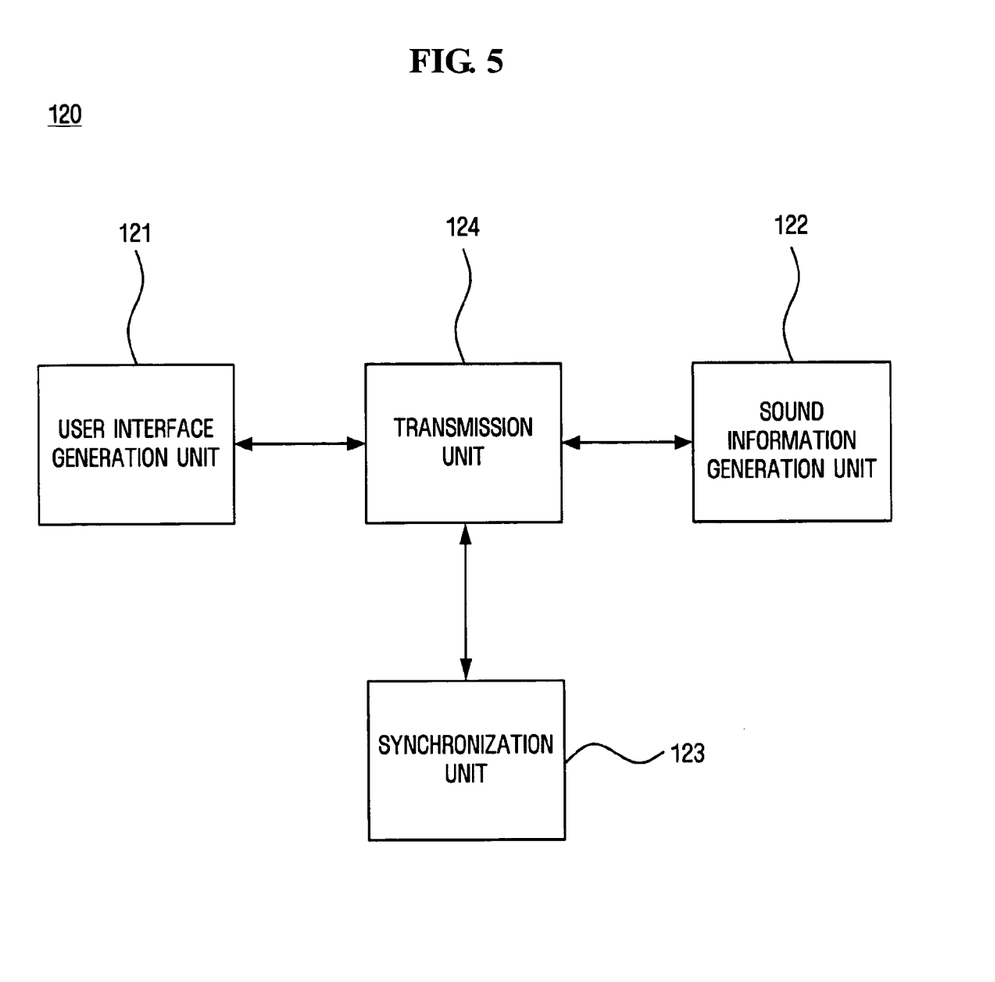
FIG. 5 is a block diagram showing the construction of a control target device according to an exemplary embodiment of the present invention.

FIG. 5 is a block diagram showing the construction of a control target device according to an exemplary embodiment of the present invention.

As shown in FIG. 5, the control target device 120 according to the exemplary embodiment of the present invention may include a user interface generation unit 121 for generating a user interface in response to a request from the control device 110 connected through the home network 130, a sound information generation unit 122 for generating sound information which is to be synchronized with the generated user interface, a synchronization unit 123 for synchronizing the generated user interface unit with the sound information, and a transmission unit 124 for transmitting the user interface and the sound information to the control device 110.

When a user interface, which corresponds to an input value input by the user, is requested from the request unit 115 of the control device 110, the user interface generation unit 121 may generate the user interface based on the request.

The sound information generation unit 122 may generate sound information which is to be synchronized with the user interface generated by the user interface generation unit 121, and may generate sound information through the user interface. In the present exemplary embodiment, the sound information generation unit 122 may generate the sound information which is synchronized with the generated user interface. Furthermore, in the case where an abnormality occurs in the control target device 120 and the user interface generation unit 121 cannot provide the user interface requested by the control device 110, the sound information generation unit 122 may generate sound information for informing the control device 110 of that fact.

Furthermore, although, in the present exemplary embodiment, a description of the case where the sound information is generated by the sound information generation unit 122 is made by way of example, no limitation is made thereto, and previously stored sound information may be extracted.

In the case where the sound information to be synchronized with the user interface generated by the user interface generation unit 121 is generated by the sound information generation unit 122, the synchronization unit 123 may synchronize the generated user interface with the generated sound information.

The transmission unit 124 may transmit the user interface and the sound information, which are respectively generated by the user interface generation unit 121 and the sound information generation unit 122, to the control device 110 that has requested the user interface. In this case, the sound information may conform to the transmission protocol of the user interface, but no limitation is made thereto.

Figure 6:
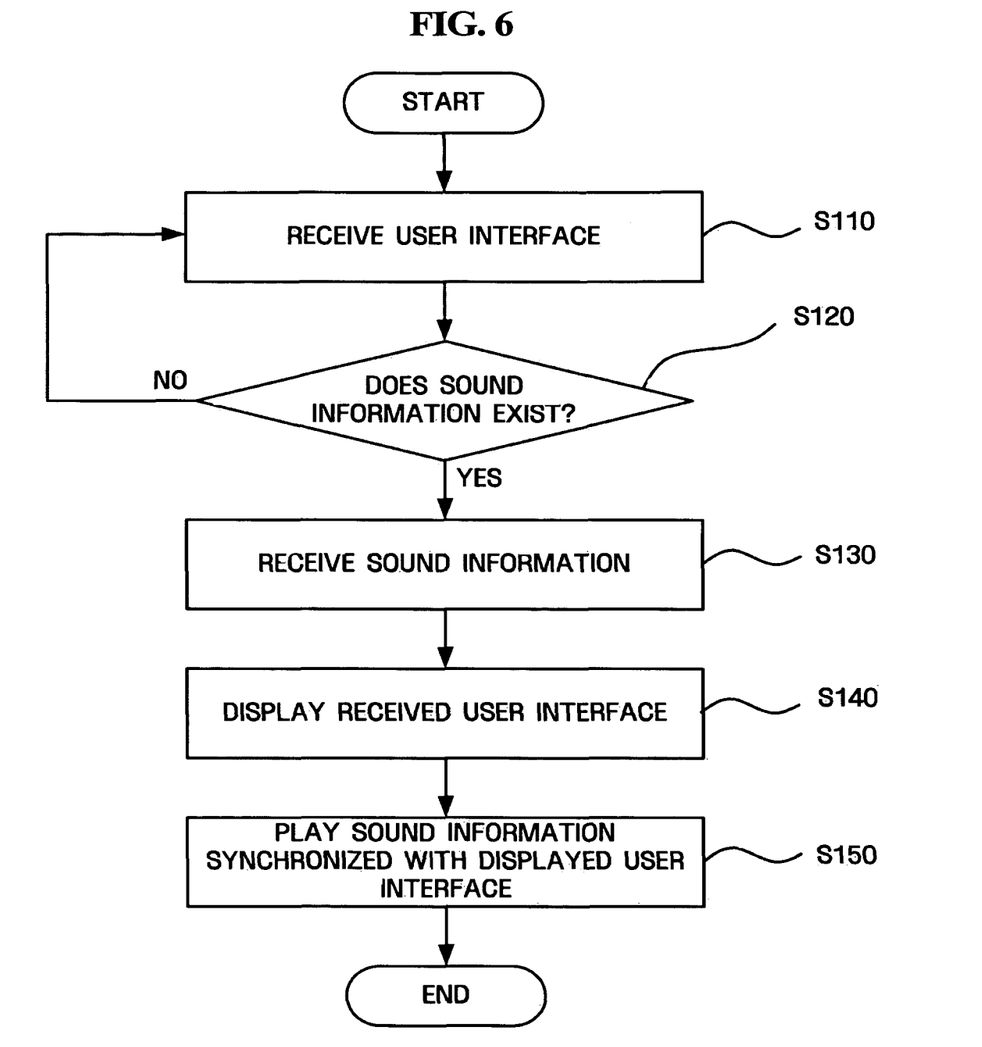
FIG. 6 is a flowchart illustrating a method of receiving sound information according to a first exemplary embodiment of the present invention.

FIG. 6 is a flowchart illustrating a method of receiving sound information according to a first exemplary embodiment of the present invention. With reference to FIG. 6, a description of the case where the user inputs an input value for controlling a specific control target device through the user interface previously received from the control device 110 and requests a user interface, which corresponds to the input value input by the user, from the corresponding control target device is made by way of example.

As shown in FIG. 6, a method of receiving sound information in the control device 110 according to the first exemplary embodiment of the present invention is described. First, the reception unit 111 receives the user interface, which is requested from the control target device 120, according to an input value input by the user at step S110.

Furthermore, when sound information synchronized with the user interface exists at the time of reception of the user interface at step S120, the reception unit 111 receives the user interface along with the synchronized sound information at step S130. In this case, the sound information may be received at the same time as the user interface, or the sound information and the user interface may be received in sequence. The, received sound information may conform to the transmission protocol of the user interface.

Figure 7:
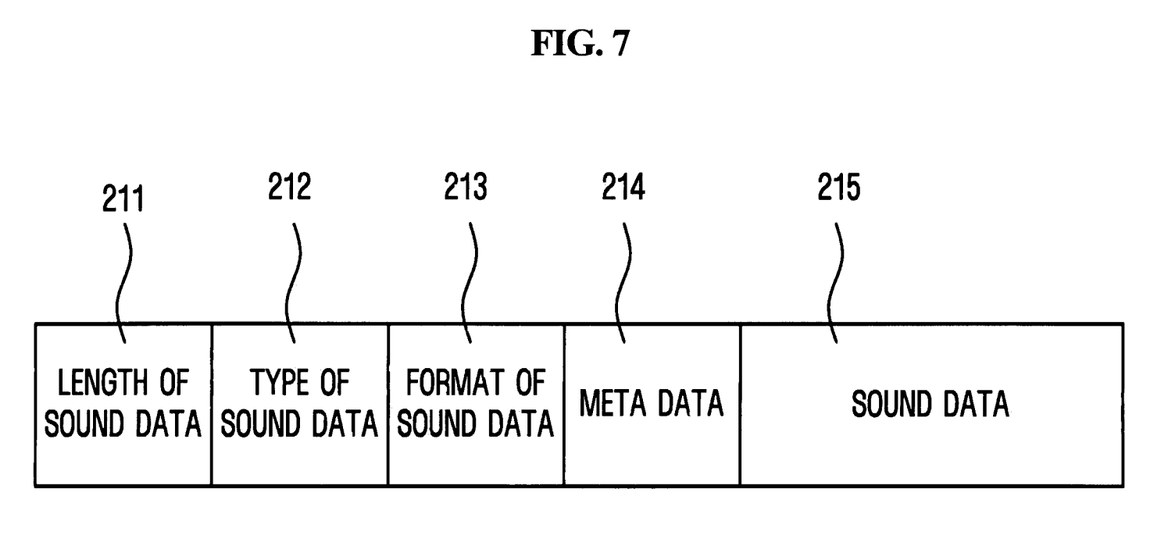
FIG. 7 is a diagram showing a sound information transmission protocol according to a first exemplary embodiment of the present invention.

In detail, the transmission protocol of the received sound information, as shown in FIG. 7, may include the length of sound data 211, indicating the length of the sound data that will be actually played by the sound playing unit 113, the type of the sound data 212, such as an effect sound or audio data, that will be actually played by the sound playing unit 113, the format of the sound data 213, such as WAV, MP3, or WMA, meta data 214 including the channel information and the bit rate of the sound data, and the sound data 215 itself.

The display unit 112 displays the user interface, received through the reception unit 111, at operation S140, as shown in FIG. 6.

When the user interface received through the display unit 112 is displayed, the sound playing unit 113 plays the synchronized sound information based on the above-described sound information of FIG. 7 at operation S150.

In this case, FIG. 6 is an example of the case where the control device 110 receives sound information, including the sound data that may be played by the sound playing unit 113, from the control target device 120. In another exemplary embodiment, the control device 110 may receive only the ID information for the stored sound data from the control target device 120 in the state in which the control device 110 stores the sound data.

Figure 8:
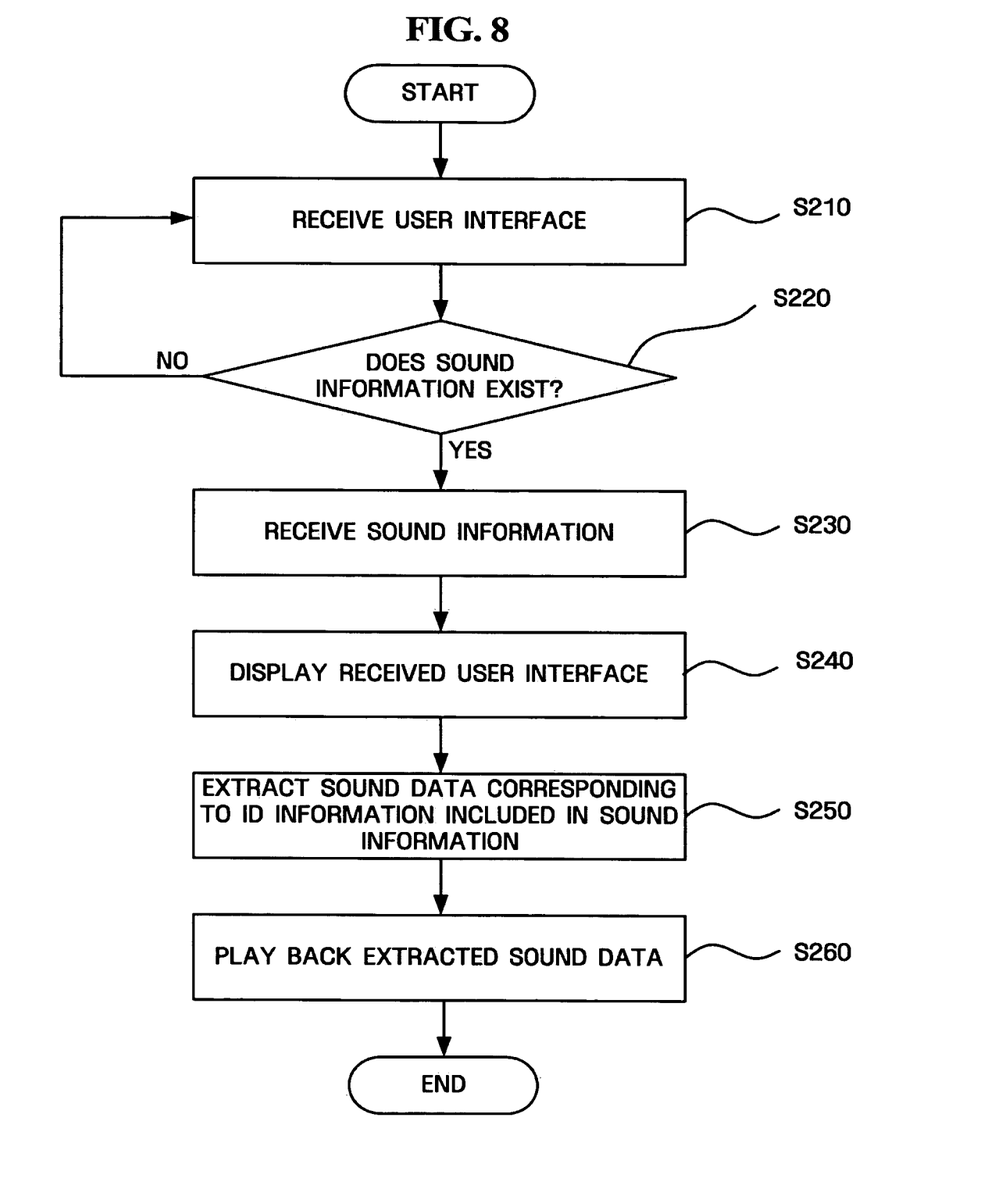
FIG. 8 is a flowchart illustrating a method of receiving sound information according to a second exemplary embodiment of the present invention.

FIG. 8 is a flowchart illustrating a method of receiving sound information according to a second exemplary embodiment of the present invention.

As shown in FIG. 8, a method of receiving sound information in the control device according to the second exemplary embodiment of the present invention is described. First, the reception unit 111 receives the requested user interface according to an input value input by the user at operation S210.

Furthermore, when sound information synchronized with the user interface exists at the time of reception of the user interface at operation S220, the reception unit 111 receives the user interface along with the synchronized sound information at operation S230. In this case, the received sound information may be simultaneously or sequentially received along with the user interface, and the received sound information may conform to the transmission protocol of the user interface.

Figure 9:
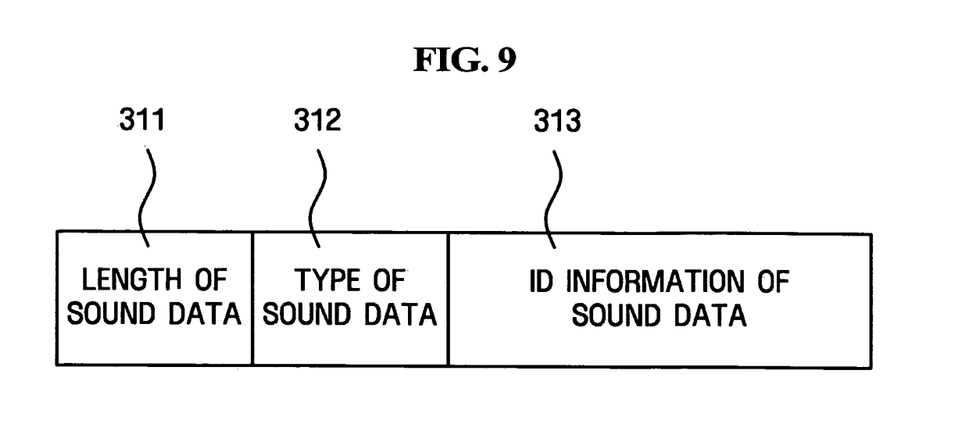
FIG. 9 is a diagram showing a sound information transmission protocol according to a second exemplary embodiment of the present invention.

In detail, the transmission protocol of the received sound information, as shown in FIG. 9, may include the length of the sound data 311, the type of the sound data 312, such as an effect sound and audio data, and the ID information of the sound data 313.

The display unit 112 displays the user interface received through the reception unit 111 at operation S240, as shown in FIG. 8.

When the received user interface is displayed, the sound playing unit 113 extracts sound data, which corresponds to sound data ID information included in the sound information, from the storage unit 116 of FIG. 4 at operation S250, and plays back the extracted sound data at operation S260.

As described above, although in FIGS. 6 and 8, the case where the sound information may be received along with the user interface is described by way of example, no limitation is made thereto. In the case where an abnormality occurs in the control target device 120 and, thereby, the user interface requested by the control device 110 is not transmitted, only sound information for providing notification of the fact may be transmitted.

Figure 10:
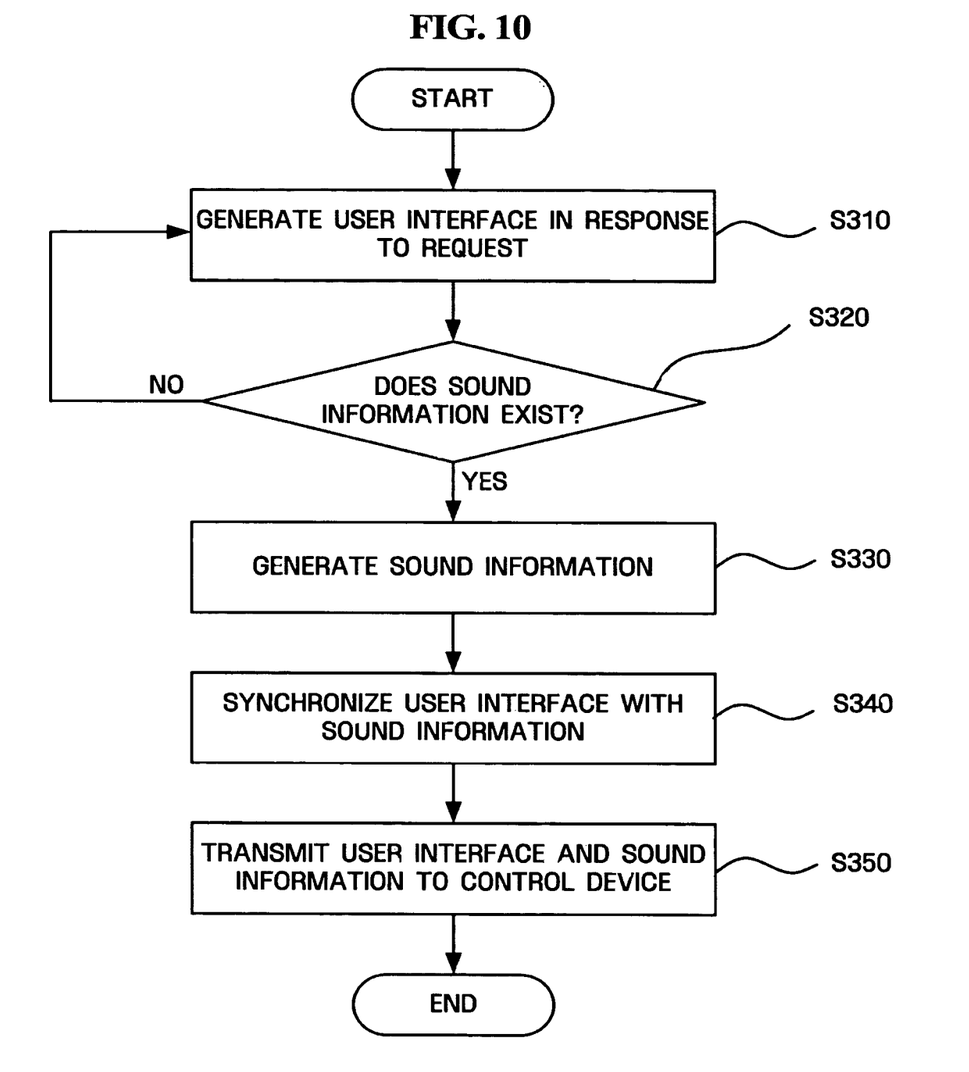
FIG. 10 is a flowchart illustrating a method of transmitting sound information according to an exemplary embodiment of the present invention.

FIG. 10 is a flowchart illustrating a method of transmitting sound information according to an exemplary embodiment of the present invention.

As shown in FIG. 10, the method of transmitting sound information in the control target device according to the exemplary embodiment of the present invention is described. First, when the user interface is received from the control device 110, the user interface received in response to the request is generated by the user interface generation unit 121 at operation S310.

When sound information to be synchronized with the user interface generated by the user interface generation unit 121 exists at operation S320, the sound information generation unit 122 generates the sound information to be synchronized with the generated user interface at operation S330. In this case, the transmission protocol of the generated sound information may selectively employ the transmission protocols of FIGS. 7 and 9 according to whether sound data is stored in the control device 110. Furthermore, the transmission protocol of the sound information may conform to the transmission of the user interface.

The synchronization unit 123 synchronizes the generated user interface with the generated sound information at operation S340, and the transmission unit 124 transmits the synchronized user interface and sound information to the control device 110 at operation S350.

In this case, although, in FIG. 10, a description of the case where the control target device 120 transmits both the user interface, which is requested by the control device 110, and sound information, which is synchronized with the user interface, is made by way of example, no limitation is made thereto. In the case where an event attributable to a different control device occurs in the control target device 120 or in the case where an event attributable to variation in the status of the control target device 120 occurs, only sound information for providing notification of whether the event has occurred may be transmitted to the control device 110.

Meanwhile, the term "unit", as used herein, means, but is not limited to, a software or hardware component, such as a field programmable gate-array (FPGA) or an application specific integrated circuit (ASIC), which performs certain tasks. A unit may advantageously be configured to reside on the addressable storage medium and may be configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality may be provided by the components and units combined into fewer components and units or may be further separated into additional components and units.

As described above, a home network device and methods of receiving and transmitting sound information using the home network device according to the exemplary embodiments of the present invention are effective in that, when the control target device transmits a user interface, the user interface is transmitted along with sound information that may conform to the transmission protocol of the user interface, so that a user can actively respond to variations in the status of the control target device when using the user interface.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home network device which is a control device for controlling a control target device, the home network device comprising:
    a reception unit configured to receive a user interface, which is used to control the control target device, and sound information, which is synchronized with the user interface, from the control target device connected through a home network, the sound information comprising sound data identification (ID) information for identifying the sound data;
    a display unit configured to display the received user interface; and
    a sound playing unit configured to extract sound data based on the sound data ID information and play back the extracted sound data when the user interface is displayed,
    wherein the sound information corresponds to a status of the control target device,
    wherein the sound information is transmitted from the control target device to the control device to notify occurrence of the event, and
    wherein the sound information conforms to a transmission protocol of the user interface.

2. The home network device of claim 1, further comprising:
    a user input unit configured to receive an input value from a user; and
    a request unit configured to request a user interface corresponding to the input value from the control target device.

3. The home network device of claim 1, wherein the sound information comprises at least one of sound data, a type of the sound data, a format of the sound data, and meta data of the sound data.

4. The home network device of claim 1, further comprising a storage unit configured to store predetermined sound data.

5. A home network device which is a control target device to be controlled by a control device, the home network device comprising:
    a user interface generation unit configured to generate a user interface in response to a request from the control device connected through a home network;
    a sound information generation unit configured to generate sound information synchronized with the generated user interface; and
    a transmission unit configured to transmit the user interface and the sound information to the control device,
    wherein the sound information comprises sound data identification (ID) information,
    wherein the sound information corresponds to a status of the control target device,
    wherein the sound information is transmitted from the control target device to the control device to notify occurrence of the event,
    wherein the sound information conforms to a transmission protocol of the user interface, and
    wherein the control device extracts sound data based on the sound data ID information and plays back the extracted sound data.

6. The home network device of claim 5, further comprising a synchronization unit configured to synchronize the generated user interface with the generated sound information.

7. The home network device of claim 6, wherein the sound information comprises at least one of sound data, a type of the sound data, a format of the sound data, and metadata of the sound data.

8. A method of receiving sound information using a home network device which is a control device for controlling a control target device, comprising:
    receiving a user interface, which is used to control the control target device, and sound information, which is synchronized with the user interface, from the control target device connected through a home network, the sound information comprising sound data identification (ID) information;
    displaying the received user interface;
    extracting sound data based on the sound data ID information; and
    playing back the extracted sound data,
    wherein the sound information corresponds to a status of the control target device,
    wherein the sound information is transmitted from the control target device to the control device to notify occurrence of the event, and
    wherein the sound information conforms to a transmission protocol of the user interface.

9. The method of claim 8, further comprising:
    receiving an input value from a user; and requesting a user interface from the control target device based on the input value.

10. The method of claim 8, wherein the sound information comprises at least one of sound data, a type of the sound data, a format of the sound data, and metadata of the sound data.

11. The method of claim 8, wherein the playing of the sound information includes:
   extracting sound data corresponding to the sound data ID information from previously stored sound data; and
   playing the extracted sound data.

12. A method of transmitting sound information using a home network device which is a control target device to be controlled by a control device, comprising:
   generating a user interface in response to a request from the control device connected through a home network;
   generating sound information synchronized with the generated user interface; and
   transmitting the user interface and the sound information to the control device,
   wherein the sound information comprises sound data identification information,
   wherein the sound information corresponds to a status of the control target device,
   wherein the sound information is transmitted from the control target device to the control device to notify occurrence of the event, and
   wherein the sound information conforms to a transmission protocol of the user interface.

13. The method of claim 12, further comprising synchronizing the generated user interface with the generated sound information.

14. The method of claim 12, wherein the sound information conforms to a transmission protocol of the user interface.

15. The method of claim 14, wherein the sound information comprises at least one of sound data, a type of the sound data, a format of the sound data, and metadata of the sound data.

* * * * *